US008639913B2

(12) United States Patent
Codrescu (10) Patent No.: US 8,639,913 B2
(45) Date of Patent: Jan. 28, 2014

(54) MULTI-MODE REGISTER FILE FOR USE IN BRANCH PREDICTION

(75) Inventor: Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 809 days.

(21) Appl. No.: 12/124,357

(22) Filed: May 21, 2008

(65) Prior Publication Data

US 2009/0292906 A1 Nov. 26, 2009

(51) Int. Cl.
*G06F 7/38* (2006.01)

(52) U.S. Cl.
USPC .......................................................... 712/239

(58) Field of Classification Search
USPC .......................................................... 712/239
See application file for complete search history.

(56) References Cited

U.S. PATENT DOCUMENTS

| | | | | |
|---|---|---|---|---|
| 4,829,422 | A * | 5/1989 | Morton et al. ................. | 718/106 |
| 5,210,831 | A * | 5/1993 | Emma et al. ................... | 712/240 |
| 5,630,130 | A * | 5/1997 | Perotto et al. ................. | 718/107 |
| 5,950,012 | A * | 9/1999 | Shiell et al. .................... | 717/169 |
| 6,092,175 | A * | 7/2000 | Levy et al. ...................... | 712/23 |
| 6,954,846 | B2 * | 10/2005 | Leibholz et al. ................ | 712/43 |
| 6,981,113 | B2 * | 12/2005 | McDonnell et al. ........... | 711/156 |
| 7,017,073 | B2 * | 3/2006 | Nair et al. ....................... | 714/11 |
| 7,120,784 | B2 * | 10/2006 | Alexander et al. ............ | 712/240 |
| 7,278,012 | B2 | 10/2007 | Sartorius et al. | |
| 7,454,596 | B2 * | 11/2008 | Jourdan et al. ................ | 712/205 |
| 2002/0194461 | A1 * | 12/2002 | Henry et al. ................... | 712/238 |
| 2005/0240930 | A1 * | 10/2005 | Amamiya et al. ............. | 718/100 |
| 2007/0288735 | A1 | 12/2007 | Vasekin et al. | |
| 2009/0122620 | A1 * | 5/2009 | Mohammad ............. | 365/189.11 |

FOREIGN PATENT DOCUMENTS

| | | |
|---|---|---|
| JP | 2004326785 A | 11/2004 |
| TW | 200713035 | 1/2007 |

OTHER PUBLICATIONS

Dal Pizzol G et al: "Branch Prediction Topologies for SMT Architectures" Computer Architecture and High Performance Computing, 2005. SBAC-PAD 2 005. 1.7th International Symposium on Rio De Janeiro, RJ, Brazil Oct. 24-27, 2005, Piscataway, NJ, USA,IEEE, Oct. 24, 2005, pp. 118-125, XP010892760 ISBN: 978-0-7695-2446-7 p. 120, paragraph 3.Branch Prediction Topologies.
International Search Report and Written Opinion—PCT/US2009/043331, International Search Authority—European Patent Office—Sep. 10, 2009.
Taiwan Search Report—TW098116742—TIPO—Nov. 1, 2012.

* cited by examiner

*Primary Examiner* — Andrew Caldwell
*Assistant Examiner* — William B Partridge
(74) *Attorney, Agent, or Firm* — Peter Michael Kamarchik; Nicholas J. Pauley; Joseph Agusta (57) ABSTRACT

A multi-mode register file is described. In one embodiment, the multi-mode register file includes an operand in a first mode. The multi-mode register file further includes auxiliary information which replaces the operand in a second mode.

18 Claims, 11 Drawing Sheets

MULTI-MODE REGISTER FILE FOR USE IN BRANCH PREDICTION

FIELD OF THE DISCLOSURE

Embodiments of the inventive concepts disclosed herein relate generally to the field of data processing systems. More particularly, embodiments of the inventive concepts disclosed herein relate to a multi-mode register file.

BACKGROUND

To process an instruction in a processor, the stages of processing may include fetch (to get the instruction), decode (to break down the instruction into the operation and the operands, e.g., Operand A plus Operand B), retrieve operands from the register file, execute the instruction, and writeback the result (e.g., the sum of Operand A plus Operand B). Before pipelining, a processor would execute all of the stages for one instruction before proceeding to the next instruction. To increase computing speed, pipelines were implemented in processors in order to break apart the different stages of processing an instruction. Thus, one stage of processing an instruction may be executed while another stage of processing a subsequent instruction is executed during the same clock cycle. For example, while a first instruction is decoded during a first clock cycle, a second instruction may be fetched during the first clock cycle. Then, while operands are being retrieved from the register file for the first instruction during a second clock cycle, the second instruction may be decoded and a third instruction may be fetched during the second clock cycle. The simultaneous processing of multiple instructions through pipelining may increase the computing speed of the processor.

A branch instruction may point the processor to begin computing an instruction at a different position in the program. For example, a fifth instruction being a branch instruction may jump the processor to begin processing a twentieth instruction. Using pipelining, though, the processor may begin retrieving and decoding subsequent instructions (e.g., instructions six, seven, and eight) before executing the branch instruction. Thus, if a branch is taken, the instructions in the middle of being processed are removed and the new instruction branched to is processed. Processing instructions that are not to be processed costs time and thus affects processing speed. In addition, mis-speculated instructions also waste energy.

As a result, a processor may include branch prediction logic in order for a processor to predict which instruction after a branch instruction is to be fetched (i.e., determine whether or not a branch is to be taken). The branch prediction logic reduces the number of times a processor incorrectly fetches an instruction because of a missed branch. Branch prediction logic may include a branch history table and/or a branch target cache. The branch history table stores some variation of the branch history for each branch instruction to be predicted. The branch history is a record of whether a branch is or is not taken for each execution of the branch instruction. The branch history table may be a two by n bit table, wherein each of the n rows corresponds to a different branch instruction of the program and the two bits for each of the n rows are used by the processor to predict whether or not to take the branch for the branch instruction corresponding to the row. More rows means more branch instructions may be predicted. The two bits may act as a counter where equaling 1-1 may mean to predict taking the branch, 0-0 may mean to predict not taking the branch, and 1-0 or 0-1 may mean unsure. The bits are trained by observing the branch history for each branch instruction to be predicted. If a branch is taken, then the counter is incremented (until reaching 1-1). If the branch is not taken, then the counter is decremented (until reaching 0-0)

The branch target cache stores the destination for each branch instruction to be predicted. In one embodiment, the branch target cache may store a destination for a number of branch instructions equal to the number of rows or registers of the branch target cache (e.g., one row or register per branch target). The branch target cache may store the address of the instruction pointed to by a branch for a branch instruction. One problem with including a branch history table and/or a branch target cache in a processor is that the branch history table and branch target cache are additional logic, thus increasing area of and power consumption by the processor.

SUMMARY OF THE DISCLOSURE

In an embodiment, a multi-mode register file is described. The multi-mode register file includes an operand during a first mode. The multi-mode register file further includes auxiliary information which replaces the operand in a second mode.

Advantages of one or more embodiments disclosed herein may include minimal size increase to the circuit for including branch prediction logic and power savings.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present inventive concepts disclosed herein are better understood when the following Detailed Description is read with reference to the accompanying drawings, wherein.

DETAILED DESCRIPTION

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Embodiments of the inventive concepts disclosed herein relate to a multi-mode register file for use in branch prediction. Each thread of a processor may have its own register file. For example, a six thread processor may have six register files. During execution of a thread, a register file stores operands that have been retired by the processor for the thread. For example, for instruction/operation "operand A plus operand B," the register file may store the sum for later retrieval.

In multithread architectures, not all threads may be executing at one time. For example, listening to an audio file may cause one thread to operate, but the other threads may not be required. Therefore, in one embodiment, the register files associated with the inactive threads may be used to store auxiliary information not corresponding to the respective active thread, such as branch prediction information. The branch prediction information may be used by the processor to predict branches for the active streams of instructions. As a result, a register file of a multithread architecture may be in a first mode, storing operands for its respective thread, or in a second mode, storing auxiliary information, such as branch prediction information.

Branch prediction information may include a branch history table and/or a branch target cache. When a multi-mode register file is in a second mode and storing branch prediction information, the register file may store one or both of the branch history table and the branch target cache for an active thread. As a result, the table(s) stored in the register file are used to predict branches in the active threads not associated with the register file. Once the thread corresponding to the register file in the second mode is to become active again (i.e., the instructions of the thread are to be executed by the processor), the register file is switched from the second mode to the first mode in order to store operands for the newly active thread. In one embodiment, when a register file switches to a first mode, any auxiliary information stored in the register file may be transferred to one or more register files for currently inactive threads in a multithread architecture. In another embodiment, all or part of the auxiliary information stored in the register file may be lost. While loss of branch prediction information may cause the processor to recompile branch prediction information, correctness of branch prediction is ensured when the processor recompiles such information.

If all threads of a multithread architecture are active, then all of the register files are in a first mode storing operands for their respective threads. As a result, branch prediction may not be performed since none of the register files are in a second mode to store branch prediction information. On the other hand, multiple threads may be inactive, and not all of the register files for the inactive threads may be needed for storing branch prediction information. Thus, the processor may include logic to prioritize which register files are to be in a second mode (e.g., to store branch prediction information). In addition, the processor may include logic to determine which threads are to execute an instruction stream and which threads are to be inactive, thus prioritizing instruction execution among the multiple threads.

Figure 1:
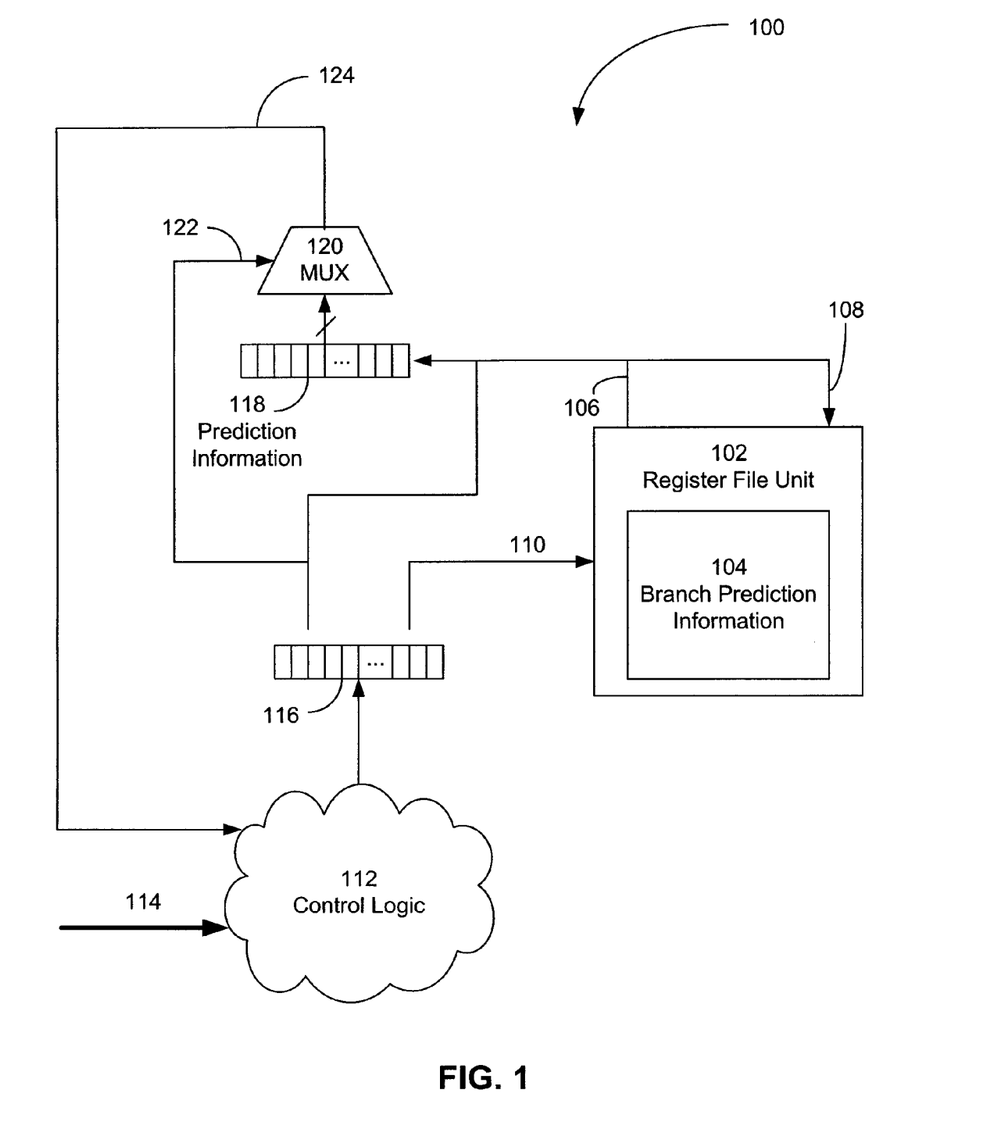
FIG. 1 is a schematic illustrating an exemplary circuitry within a processor for implementing branch prediction.
Figure 2:
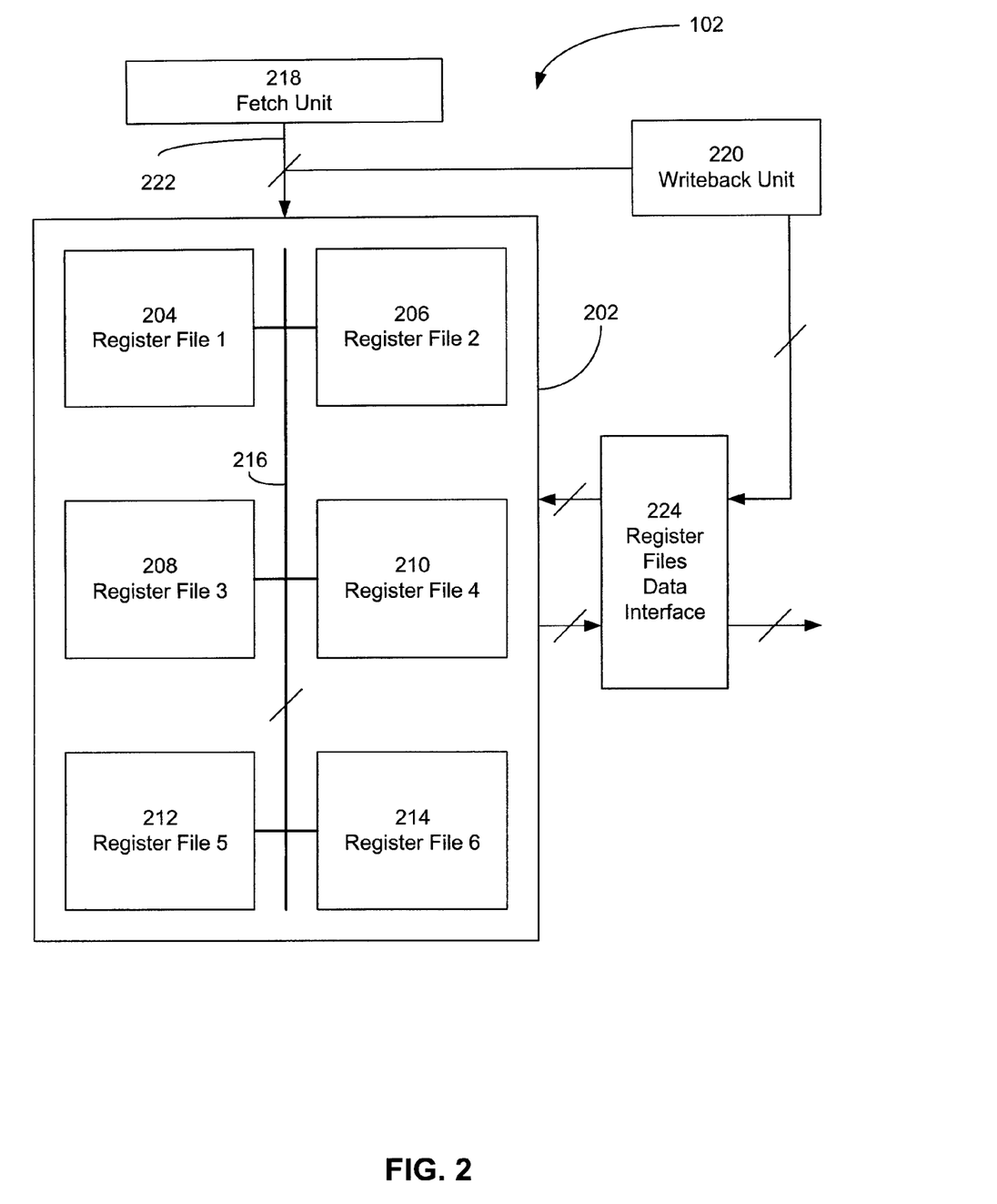
FIG. 2 is a schematic illustrating an exemplary Register File Unit of the schematic in FIG. 1.
Figure 3:
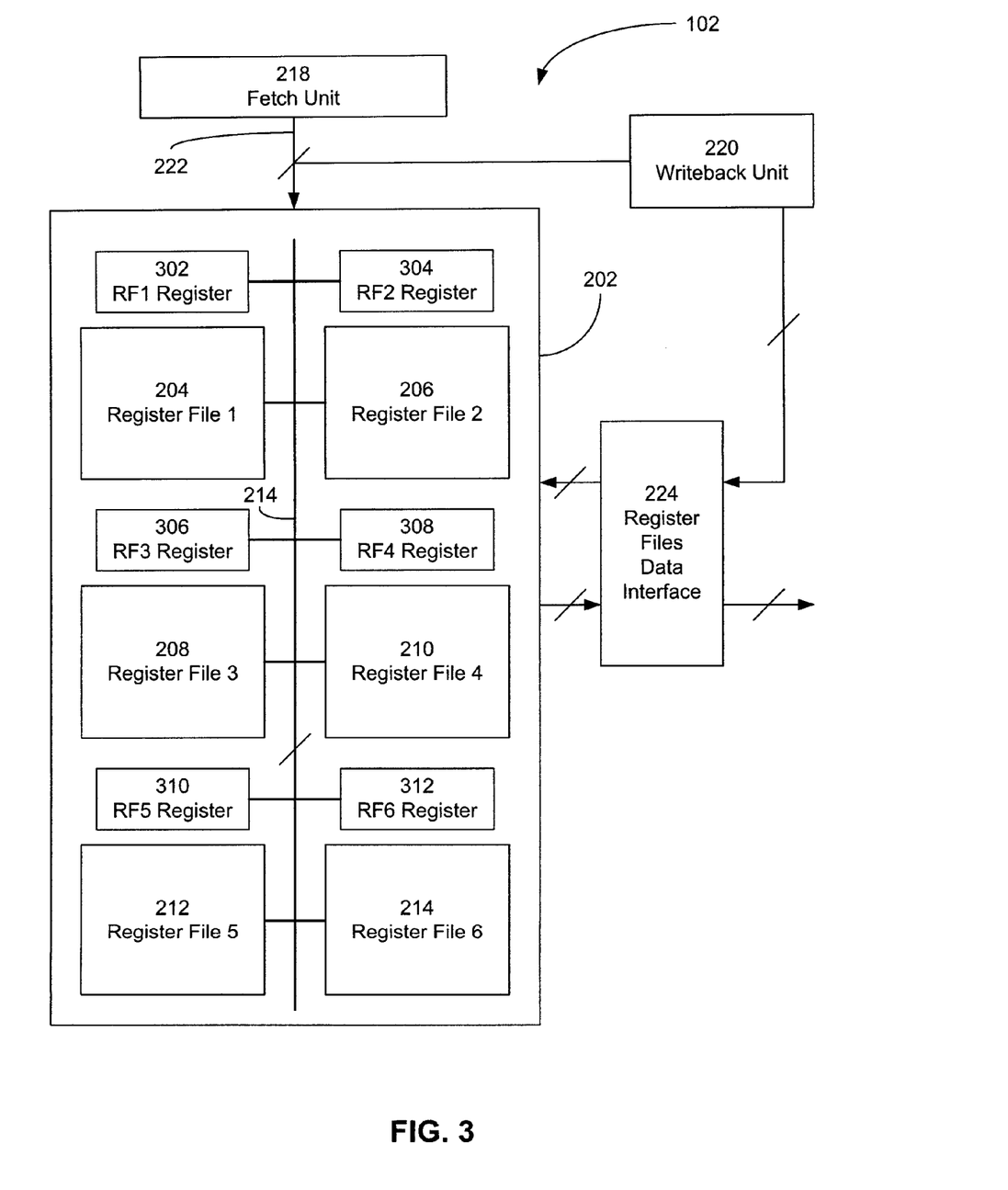
FIG. 3 is an alternative schematic illustrating an exemplary Register File Unit of the schematic in FIG. 1.
Figure 4:
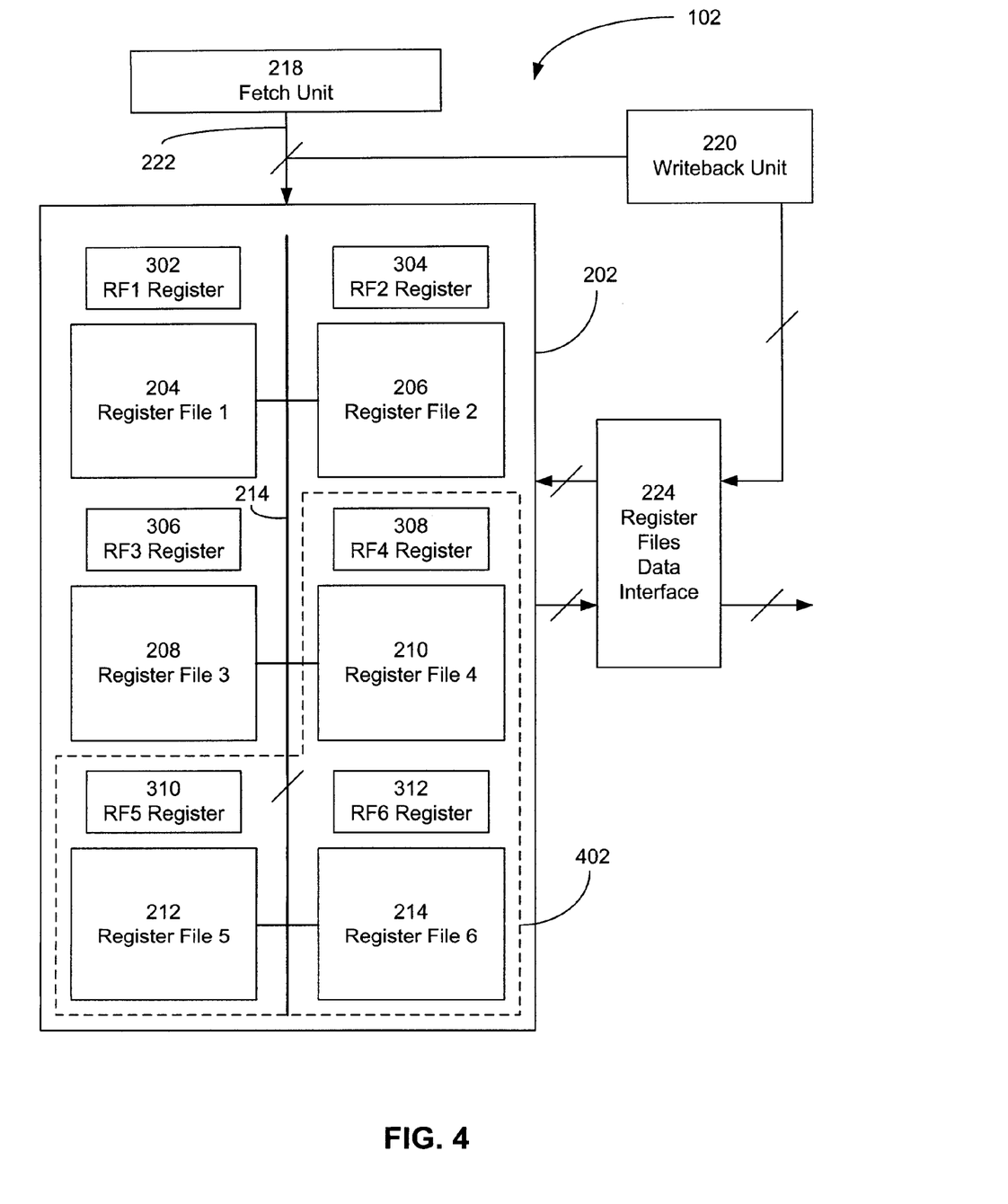
FIG. 4 is a schematic illustrating an exemplary separation of the Register Files of the schematic in FIG. 3 for use in a first mode or for use in a second mode.

The schematics of FIGS. 1-4 illustrate embodiments of an exemplary circuitry within a processor for implementing branch prediction. The schematic of FIG. 1 illustrates an exemplary circuitry within a processor 100 for branch prediction. The schematic of FIG. 2 illustrates an exemplary register file unit 102 of the schematic in FIG. 1, wherein the register file unit 102 includes multiple register files. The schematic of FIG. 3 illustrates an exemplary register file unit 102 of the schematic in FIG. 1 including multiple register files and their respective register file registers. The schematic of FIG. 4 illustrates an exemplary separation of the register files of the register file unit 102 in FIG. 3 for use in a first mode or for use in a second mode.

The processor 100 (FIG. 1) may include branch prediction logic for predicting branches, wherein the branch prediction information 104 is stored in the register file unit 102. The logic may be in addition to other operational circuitry included in the processor 100. As previously stated, the branch prediction information 104 may be one or both of the branch history table and the branch target cache. In another embodiment, the branch prediction information may be any information to allow the processor to attempt to predict a branch. In FIG. 1, the branch prediction information 104 is a branch target cache. The register file unit 102 includes a read port 106 for reading data from the register file unit 102, a write data port 108 for writing data to the register file unit 102, and an address bus 110 for identifying a specific address of the register file unit 102 to be accessed (read or write). As illustrated, the register file unit 102 may be coupled to a control logic 112.

In one embodiment, the control logic 112 determines if a branch instruction is encountered in processing the instructions from the instruction pipeline 114 and whether a branch is to be predicted for the encountered branch instruction. In one embodiment, the branch instruction is determined during decode of the instruction in the pipeline. In determining whether a branch is encountered, the control logic 112 may determine whether the address of the encountered instruction matches a known address of a branch instruction. In one embodiment, the address of the encountered instruction may be pulled from the instruction's program counter 116. The addresses of the known branch instructions may be accessed from the branch prediction information 104 or from a separate list. If the address of the encountered instruction matches the address of a branch instruction, then the control logic 112 assumes the encountered instruction is a branch instruction.

The processor 100 may then determine the destination of the branch by accessing the branch history information 104. In one embodiment, the processor 100 creates an address from the program counter 116 for the branch instruction to be sent on the address bus 110 to access the register file unit 102 for prediction information 118. Since the branch prediction information 104 includes a branch access table (which includes the target address of a branch), the prediction information 118 includes the target address for the encountered branch instruction. If the branch is to be taken, then the target address from the prediction information 118 is used in taking the branch.

The multiplexer 120 may determine if the branch is to be taken, wherein the control input to the multiplexer 120 may be the branch history information. One input to the multiplexer 120 may be the target address from the prediction information 118. In one embodiment, another input into the multiplexer is a logic zero (e.g., ground) so that the multiplexer outputs a logic zero onto branch prediction 124 if the branch is not to be taken. In another embodiment, the multiplexer 120 is configured to output a high impedance signal onto branch prediction 124 if the branch is not to be taken.

In the schematic of FIG. 1, the branch history information may be stored in the program counter 116. For example, a two-bit branch history for the encountered branch (as previously described for the branch history table) may be stored in the program counter 116. As a result, the circuitry may output the branch history information from the program counter 116 onto control 122 in order to control the multiplexer 120 outputting onto branch prediction 124 whether or not the branch should be taken. For example, if the two bits of branch history in the program counter are 1-1, then the control 122 includes a signal to switch the multiplexer 120 in order to output on branch prediction 124 a prediction to take the branch.

If a branch is to be taken (e.g., branch history equals 1-1), in one embodiment, the target address is sent to branch prediction 124 in order to feed it back to control logic 112. The control logic 112 then determines from the signal that the branch is to be taken and jumps the stream to the instruction located at the target address. In another embodiment, a logic one may be sent to control logic 112 via branch prediction 124 in order for the control logic 112 to determine that a branch is to be taken. If a branch is not to be taken (e.g., branch history equals 0-0), then a logic zero or high impedance may be received by the control logic 112 via the branch prediction 124. The control logic then determines from the signal that the stream should progress to processing the instruction subsequent to the branch instruction, not taking the branch.

In another embodiment and as previously stated, the branch history may be stored in the register file unit 102 as a branch history table. As such, the branch history table in the register file unit 102 may optionally output from the read data port 106 onto control 122 in order to control the output of multiplexer 120. In one embodiment, the branch history and target address for a branch instruction may be stored in one register, thus combining the branch history table information and branch target cache information.

Referring to FIG. 2, the register file unit 102 may include a storage 202 which includes multiple register files 204-214. In the illustrated embodiment, six register files are illustrated, wherein the processor may be a six thread architecture. In other embodiments, the number of register files may be any number greater than one (e.g., two), wherein at least one of the register files may be in a first mode and at least one of the register files may be in a second mode. Each of the register files 204-214 is associated with a respective thread of the six-thread architecture processor. For example, register file 1 204 may be associated with a first thread of the processor. The register files 204-214 may be interconnected via a bus 216. Therefore, branch prediction information for register files in a second mode may be split among the register files in the second mode. In another embodiment, a portion of the register files may be single mode (only storing operands) while the remaining register files are multi-mode register files.

Referring again to FIG. 2, the storage 202 is connected to a fetch unit 218 and a writeback unit 220. The fetch unit 218 sends an address 222 to the storage 202 in order to access and fetch a register value of one of the register files 204-214. The accessed value is sent to the register files data interface 224, which outputs the value from the register file unit 102. The writeback unit 220 sends an address 222 for a register in storage 202 to which data is to be written and stored. In one embodiment, the fetch unit 218 and the writeback unit 220 may access operands from/to register files in a first mode and auxiliary information (e.g., branch prediction information) from/to register files in a second mode.

Referring to FIG. 3, the register file unit 102 may further include register file registers 302-312 (e.g., in storage 202). In one embodiment, each register file register 302-312 is associated with a register file 204-214. For example, RF1 register 302 is associated with register file 1 204, RF2 register 304 is associated with register file 2 206, and so forth. The register file registers 302-312 may include information about their respective registers 204-214, including priority information as to when to switch the register to a second mode, priority information as to when the register is to be in a first mode, or information as to which thread the corresponding register is associated. For example, RF1 register 302 may include information that register file 1 204 is associated with thread 0, register file 1 204 is the first register to be in a first mode in order to store operands, and/or register file 1 204 is the last register to be in a second mode to store auxiliary information. In another embodiment, the register file register may include information about whether a corresponding register is in a first mode or a second mode.

In one embodiment, since the register file register 302-312 for each register 204-214 includes information about priority of when the respective register file is to be in a first mode and when the respective register file is to be switched to a second mode, the processor 100 may use the information in order to control which register files are in a first mode and which register files are in a second mode. For example, the processor may switch a register file from/to a first mode to/from a second mode by controlling the register file registers 302-312 via bus 214.

The schematic of FIG. 4 illustrates one example where register files 204-208 are in a first mode and register files 210-214 are in a second mode. As previously described, the register file registers 302-312 may include priority information of when the register files 204-214 are to be in a first mode. For example, the priority information may be that register file 1 204 is the first register file to be in a first mode (i.e., its associated thread is first for execution of instructions), register file 2 206 is the second register file to be in a first mode (i.e., its associated thread is second for execution of instructions), register file 3 208 is the third register file to be in a first mode (i.e., its associated thread is third for execution of instructions), register file 4 210 is the fourth register file to be in a first mode (i.e., its associated thread is fourth for execution of instructions), register file 5 212 is the fifth register file to be in a first mode (i.e., its associated thread is fifth for execution of instructions), and register file 6 212 is the sixth and last register file to be in a first mode (i.e., its associated thread is sixth for execution of instructions). Hence, if five threads are to be executing instructions, then register files 204-212 are to be in a first mode (e.g., storing operands for their respective threads) and register file 6 214 does not need to be in a first mode.

Also as previously described, the register file registers 302-312 may include priority information of when the register files 204-214 are to be in a second mode. For example, the priority information may be that register file 1 204 is the sixth and last register file to be in a second mode (e.g., to store branch prediction information for active threads), register file 2 206 is the fifth and next to last register file to be in a second mode, register file 3 208 is the fourth register file to be in a second mode, register file 4 210 is the third register file to be in a second mode, register file 5 212 is the second and next to first register file to be in a second mode, and register file 6 212 is the first register file to be in a second mode. Hence, if two threads are executing instructions, then register files 208-214 are available to be in a second mode. If two register files are to be in a second mode, then register files 212-214 are in a second mode. In one embodiment, whether a register file is in a first mode (i.e., the respective thread is active/executing instructions) has priority over whether a register file is to switch to a second mode.

Referring again to FIG. 4, in the example, three threads are to be active and three register files are to be in a second mode. Hence, register files 204-208 are in a first mode storing operands for the active threads. Register files 210-214 are in a second mode to store, e.g., branch prediction information for the three active threads. In one embodiment, the branch prediction information may be split or spread out amongst all of the storage 402 in the second mode. Therefore, when more register files 204-214 are in a second mode, more storage exists for storing branch prediction information, thus allowing the branch history table and branch target cache to be larger (e.g., more rows in each table) in order to allow the prediction of more branch instructions.

Figure 5:
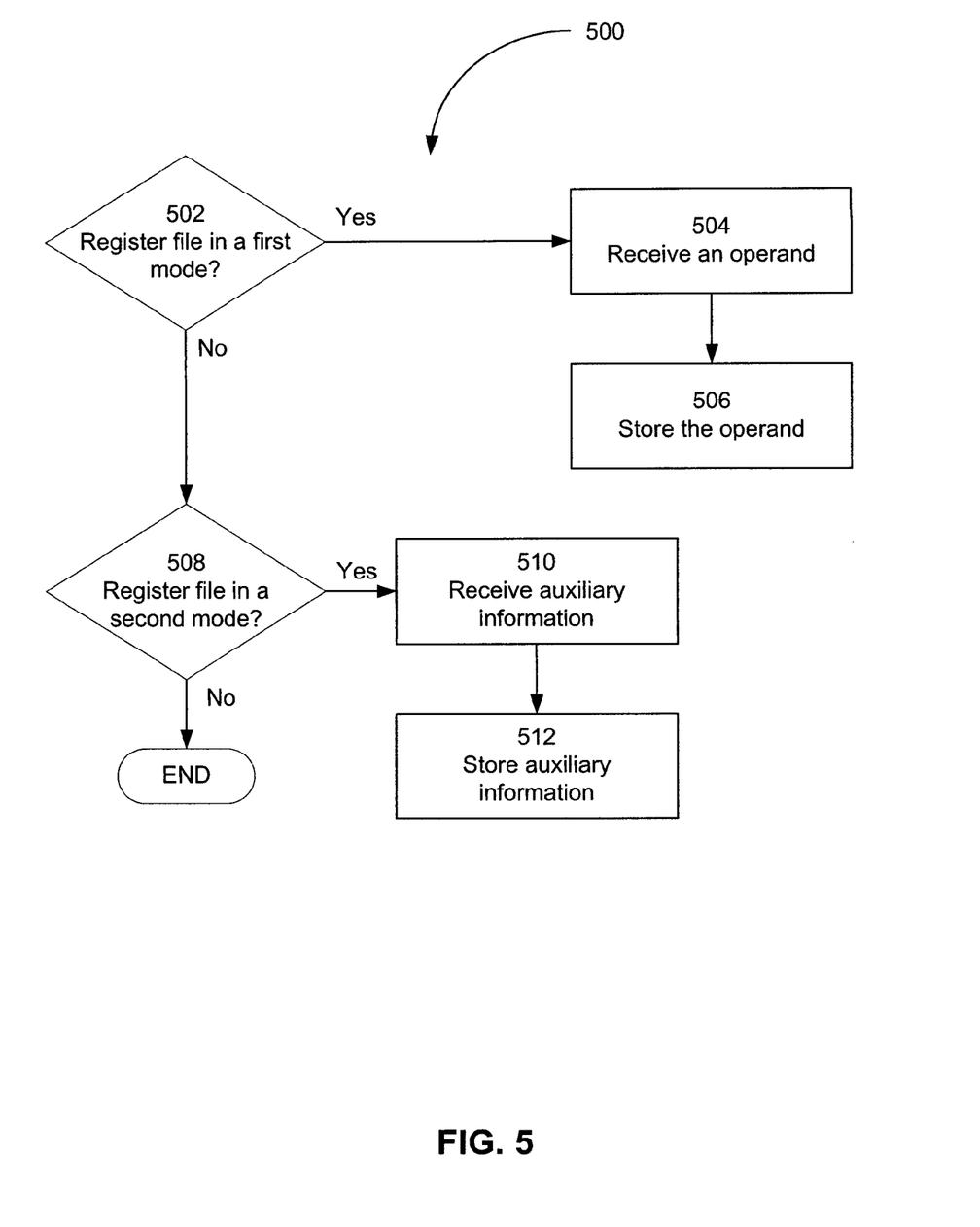
FIG. 5 is a flowchart illustrating an exemplary method for storing information in one multi-mode register file.

FIG. 5 is a flowchart illustrating an exemplary method 500 for storing information in one multi-mode register file of FIGS. 1-3. Beginning at 502, the processor 100 determines if the multi-mode register file (e.g., register file 1 204 in FIG. 3) is in a first mode. In one embodiment of determining if register file 1 204 is in a first mode, the processor 100 accesses the RF1 register 302, which is associated with register file 1 204 and may include information as to which mode the register file 1 204 is in. In another embodiment, the processor 100 may examine the priority information of the RF1 register 302 and the number of active threads to determine if the register file 1 204 is in a first mode. In another embodiment, the processor 100 may determine the respective thread for the register file 1 204 (e.g., thread 0) and determine if the respective thread is active. If the register file 1 204 is in a first mode, then the respective thread for the register file 1 204 is active and the register file 1 204 may receive an operand from the writeback unit 220 (FIG. 3) in 504. Upon receiving the operand, the register file may store the operand (506) in the register location identified by the writeback unit 220.

If the processor 100 determines that the register file is not in a first mode in 502, then the processor 100 may determine if the multi-mode register file 1 204 is in a second mode in 508. In one embodiment, the processor 100 may assume that the register file 1 204 is in a second mode if the register file 1 204 is not in a first mode. In another embodiment, the register file 1 204 may be inactive and thus not in a first or second mode. Thus, if the processor 100 determines that the register file 1 204 is not in a second mode, then the register file 1 204 is in neither first nor second mode and may not be accepting information at the time. If the multi-mode register file is in a second mode, then the register file 1 204 receives auxiliary information (e.g., branch prediction information) from the writeback unit 220 (FIG. 3) in 510. Upon receiving the auxiliary information, the register file 1 204 may store the auxiliary information (506) in the register location identified by the writeback unit 220.

Figure 6:
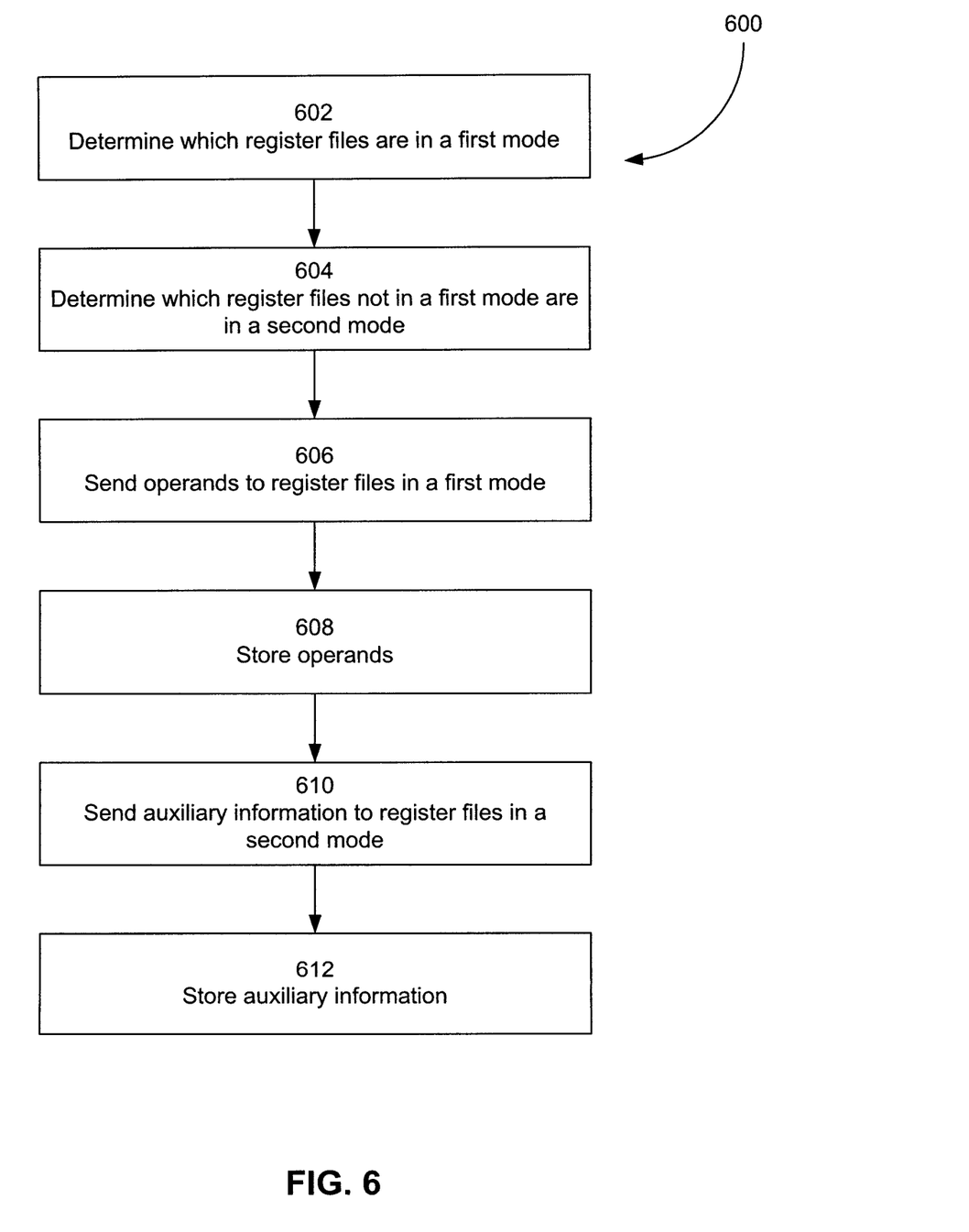
FIG. 6 is a flowchart illustrating an exemplary method for storing information in a plurality of multi-mode register files dependent on the mode of each of the multi-mode register files.

The flowchart of FIG. 6 illustrates an exemplary method 600 for storing information in a plurality of multi-mode register files 204-214 of the register file unit 102 in FIGS. 1-3 dependent on the mode of each of the multi-mode register files 204-214. Beginning at 602, the processor 100 determines which multi-mode register files 204-214 of the register file unit 102 are in a first mode. In one embodiment, the processor 100 determines which threads are active and, from the register file registers 302-312, which register files 204-214 are associated with the active threads. In another embodiment, the processor 100 may read the information of whether a register file is in a first mode from the associated register file register.

Upon determining which register files 204-214 are in a first mode, the processor 100 may determine which register files 204-214 are in a second mode in 604. In one embodiment, the processor 100 may read the respective register file registers 302-312 of register files 204-214 not in a first mode to determine if a register file is in a second mode. In another embodiment, the processor 100 assumes all registers 204-214 not in a first mode are in a second mode. In another embodiment, the processor 100 determines the number of registers files 204-214 to be in a second mode and reads the priority information for the second mode from the respective register file registers 302-312 of the register files 204-214.

Proceeding to 606, the processor 100 sends operands to the register files 204-214 in a first mode. For example, if thread 0 includes an operand resulting from an executed instruction, the processor 100 sends the operand to register file 1 204 (FIG. 3) to be stored. The operands are then stored by the receiving register files 204-214 in the first mode in 608.

Proceeding to 610, the processor 100 sends auxiliary information to the register files 204-214 in a second mode. For example, the processor 100 may send branch prediction information for a recently executed branch instruction, which may be used in predicting the same branch at a later time. In one embodiment, the processor 100 determines which register file 204-214 in the second mode is to store which piece of auxiliary information. For example, referring again to FIG. 4, the processor 100 may determine that register files 210-212 are to store the branch target cache and register file 6 214 is to store the branch history table for the executing instruction streams. Referring again to FIG. 6, the auxiliary information is then stored by the receiving register files 204-214 in the second mode in 612.

Example Devices Including the Above Described Features

Multi-mode register files may be included in any processors including register files, such as digital signal processors. The general diagrams of FIGS. 7-11 illustrate example devices that may incorporate multi-mode register files for storing, e.g., operands in a first mode and branch prediction information in a second mode in order to be used for predicting the branches of executing branch instructions.

Figure 7:
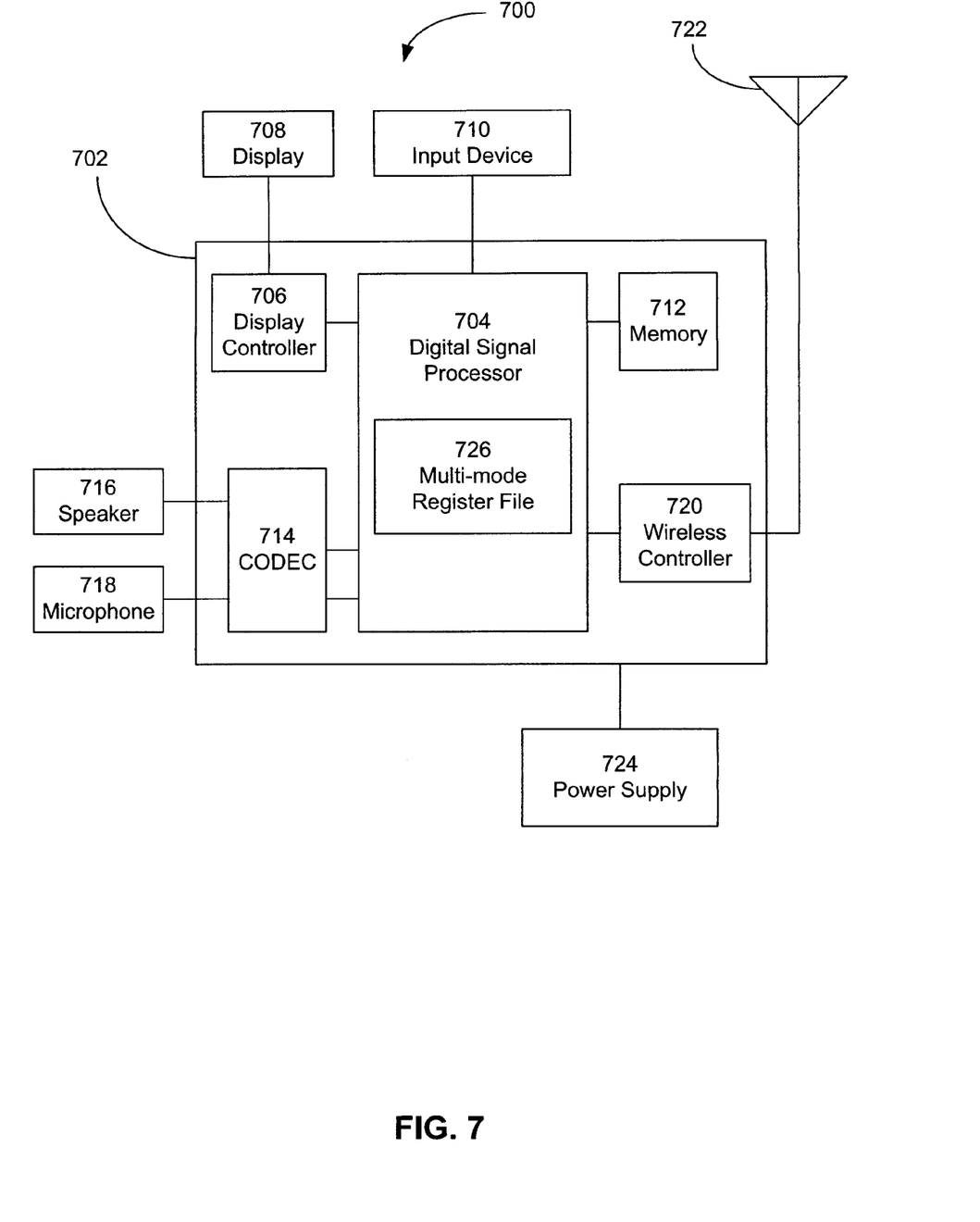
FIG. 7 is a general diagram illustrating an example portable communication device incorporating a digital signal processor that may include a multi-mode register file.

FIG. 7 is a diagram illustrating an exemplary embodiment of a portable communication device 700. As illustrated in the general diagram of FIG. 7, the portable communication device includes an on-chip system 702 that includes a digital signal processor (DSP) 704. The general diagram of FIG. 7 also shows a display controller 706 that is coupled to the digital signal processor 704 and a display 708. Moreover, an input device 710 is coupled to the DSP 704. As shown, a memory 712 is coupled to the DSP 704. Additionally, a coder/decoder (CODEC) 714 may be coupled to the DSP 704. A speaker 716 and a microphone 718 may be coupled to the CODEC 714.

The general diagram of FIG. 7 further illustrates a wireless controller 720 coupled to the digital signal processor 704 and a wireless antenna 722. In a particular embodiment, a power supply 724 is coupled to the on-chip system 702. Moreover, in a particular embodiment, as illustrated in FIG. 7, the display 708, the input device 710, the speaker 716, the microphone 718, the wireless antenna 722, and the power supply 724 are external to the on-chip system 702. However, each is coupled to a component of the on-chip system 702.

In a particular embodiment, the DSP 704 includes one or more multi-mode register files 726 in order to store, e.g., branch prediction information when the register file is not in a first mode (not storing operands for an active thread). For example, when a branch instruction is encountered by the processor 704 and the multi-mode register file 726 is storing branch prediction information, then the processor 704 uses the branch prediction information in the multi-mode register file 726 to determine whether the branch should be predicted as taken or not taken. The processor 704 then begins processing the next predicted instruction from the branch prediction.

Figure 8:
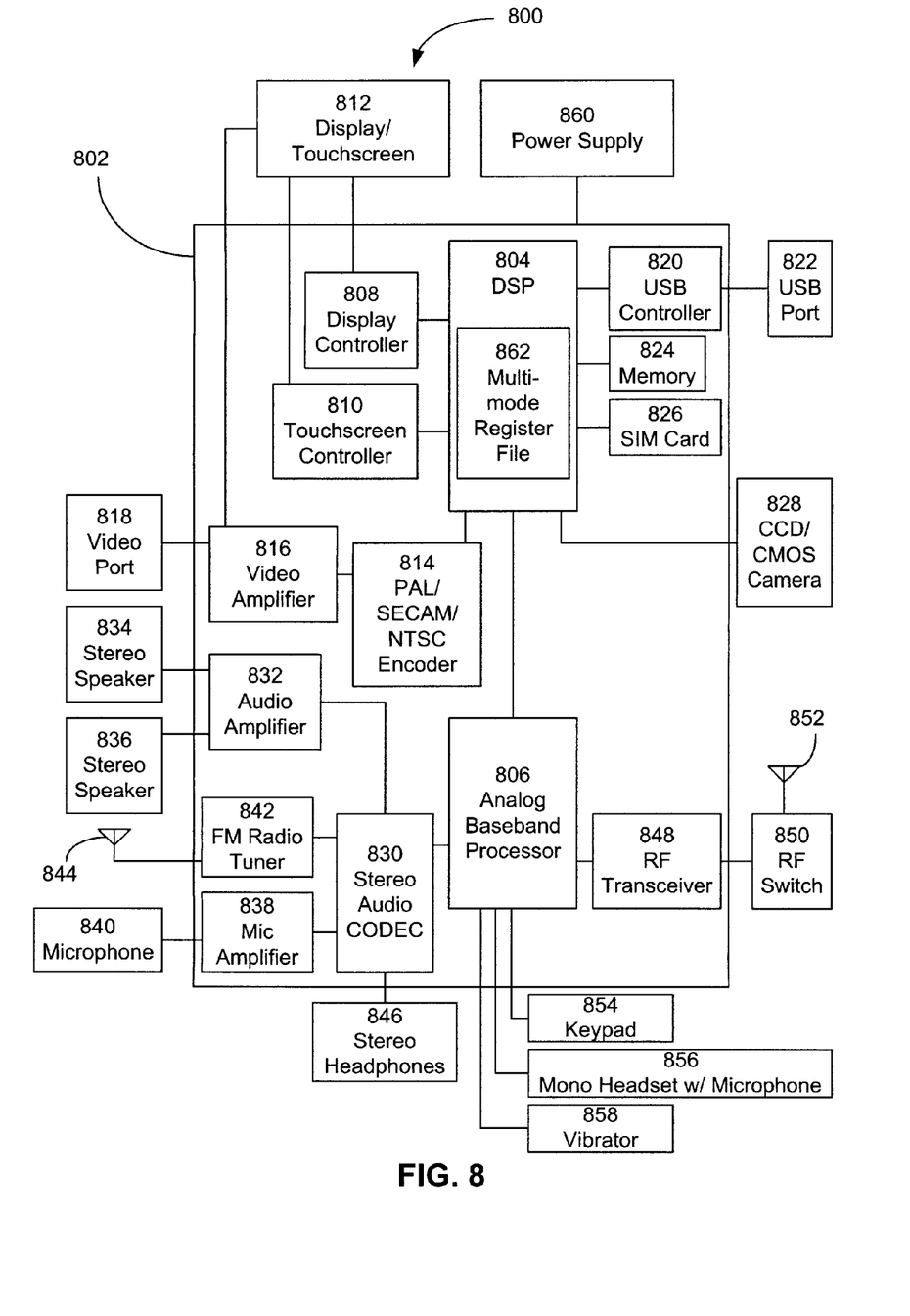
FIG. 8 is a general diagram illustrating an example cellular telephone incorporating a digital signal processor that may include a multi-mode register file.

FIG. 8 is a diagram illustrating an exemplary embodiment of a cellular telephone 800. As shown, the cellular telephone 800 includes an on-chip system 802 that includes a digital baseband processor 804 and an analog baseband processor 806 that are coupled together. In a particular embodiment, the digital baseband processor 804 is a digital signal processor. As illustrated in the general diagram of FIG. 8, a display controller 808 and a touchscreen controller 810 are coupled to the digital baseband processor 804. In turn, a touchscreen display 812 external to the on-chip system 802 is coupled to the display controller 808 and the touchscreen controller 810.

The general diagram of FIG. 8 further illustrates a video encoder 814, e.g., a phase alternating line (PAL) encoder, a sequential couleur a memoire (SECAM) encoder, or a national television system(s) committee (NTSC) encoder, is coupled to the digital baseband processor 804. Further, a video amplifier 816 is coupled to the video encoder 814 and the touchscreen display 812. Also, a video port 818 is coupled to the video amplifier 816. As depicted in the general diagram of FIG. 8, a universal serial bus (USB) controller 820 is coupled to the digital baseband processor 804. Also, a USB port 822 is coupled to the USB controller 820. A memory 824 and a subscriber identity module (SIM) card 826 may also be coupled to the digital baseband processor 804. Further, as shown in the general diagram of FIG. 8, a digital camera 828 may be coupled to the digital baseband processor 804. In an exemplary embodiment, the digital camera 828 is a charge-coupled device (CCD) camera or a complementary metal-oxide semiconductor (CMOS) camera.

As further illustrated in the general diagram of FIG. 8, a stereo audio CODEC 830 may be coupled to the analog baseband processor 806. Moreover, an audio amplifier 832 may coupled to stereo audio CODEC 830. In an exemplary embodiment, a first stereo speaker 834 and a second stereo speaker 836 are coupled to the audio amplifier 832. A microphone amplifier 838 may be also coupled to the stereo audio CODEC 830. Additionally, a microphone 840 may be coupled to the microphone amplifier 838. In a particular embodiment, a frequency modulation (FM) radio tuner 842 may be coupled to the stereo audio CODEC 830. Also, an FM antenna 844 is coupled to the FM radio tuner 842. Further, stereo headphones 846 may be coupled to the stereo audio CODEC 830.

The general diagram of FIG. 8 further illustrates a radio frequency (RF) transceiver 848 may be coupled to the analog baseband processor 806. An RF switch 850 may be coupled to the RF transceiver 848 and an RF antenna 852. A keypad 854 may be coupled to the analog baseband processor 806. Further, a vibrator device 858 may be coupled to the analog baseband processor 806. The general diagram of FIG. 8 also shows a power supply 860 may be coupled to the on-chip system 802. In a particular embodiment, the power supply 860 is a direct current (DC) power supply that provides power to the various components of the cellular telephone 800. Further, in a particular embodiment, the power supply is a rechargeable DC battery or a DC power supply that is derived from an alternating current (AC) to DC transformer that is coupled to an AC power source.

As depicted in the general diagram of FIG. 8, the touchscreen display 812, the video port 818, the USB port 822, the camera 828, the first stereo speaker 834, the second stereo speaker 836, the microphone 840, the FM antenna 844, the stereo headphones 846, the RF switch 850, the RF antenna 852, the keypad 854, the vibrator 858, and the power supply 860 may be external to the on-chip system 802. In a particular embodiment, the digital baseband processor 804 may include one or more multi-mode register files 862 in order to store, e.g., branch prediction information when the register file 862 is not in a first mode (not storing operands for an active thread).

Figure 9:
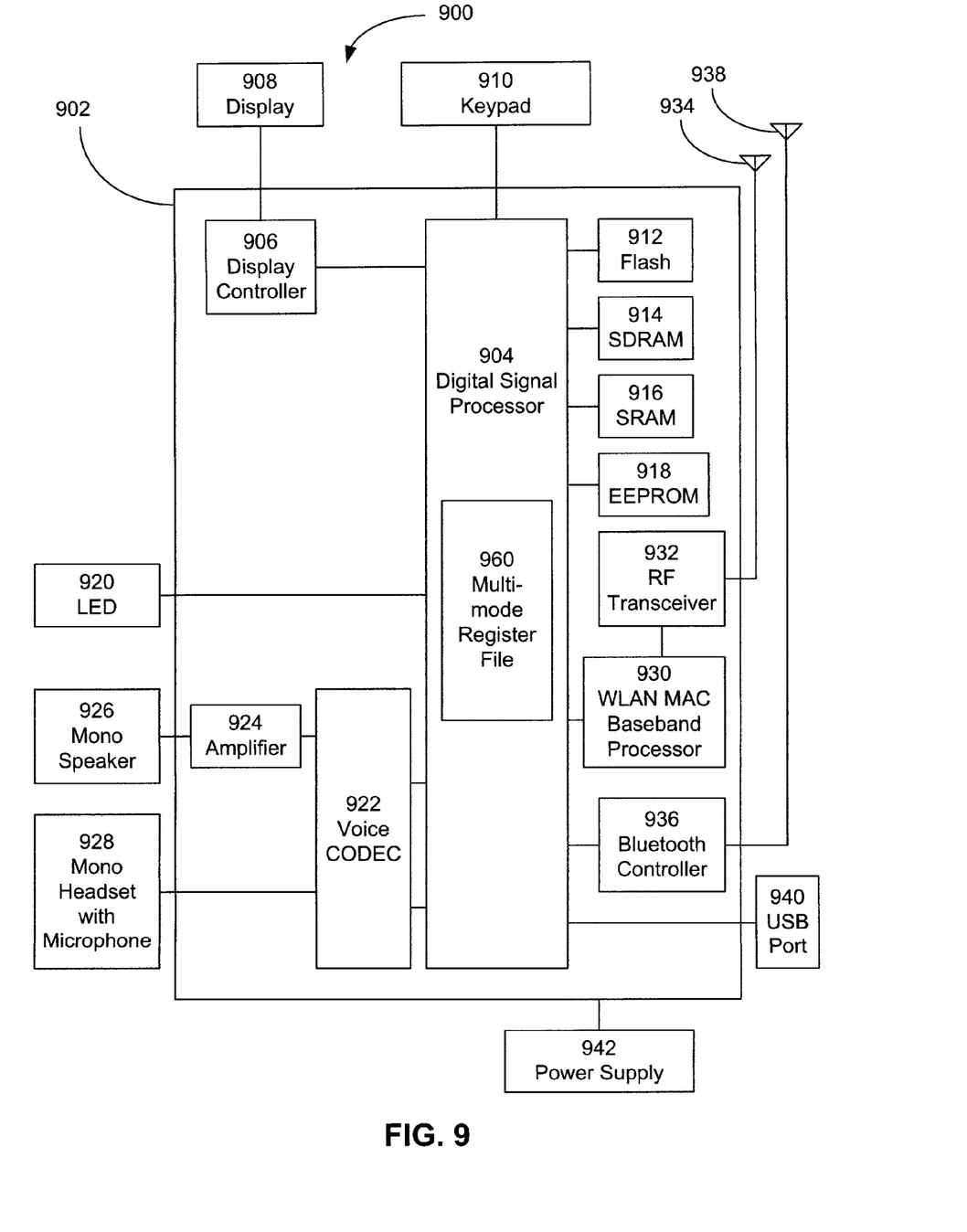
FIG. 9 is a general diagram illustrating an example wireless Internet Protocol telephone incorporating a digital signal processor that may include a multi-mode register file.

FIG. 9 is a diagram illustrating an exemplary embodiment of a wireless Internet protocol (IP) telephone 900. As shown, the wireless IP telephone 900 includes an on-chip system 902 that includes a digital signal processor (DSP) 904. A display controller 906 may be coupled to the DSP 904 and a display 908 is coupled to the display controller 906. In an exemplary embodiment, the display 908 is a liquid crystal display (LCD). FIG. 9 further shows that a keypad 910 may be coupled to the DSP 904.

A flash memory 912 may be coupled to the DSP 904. A synchronous dynamic random access memory (SDRAM) 914, a static random access memory (SRAM) 916, and an electrically erasable programmable read only memory (EEPROM) 918 may also be coupled to the DSP 904. The general diagram of FIG. 9 also shows that a light emitting diode (LED) 920 may be coupled to the DSP 904. Additionally, in a particular embodiment, a voice CODEC 922 may be coupled to the DSP 904. An amplifier 924 may be coupled to the voice CODEC 922 and a mono speaker 926 may be coupled to the amplifier 924. The general diagram of FIG. 9 further illustrates a mono headset 928 coupled to the voice CODEC 922. In a particular embodiment, the mono headset 928 includes a microphone.

A wireless local area network (WLAN) baseband processor 930 may be coupled to the DSP 904. An RF transceiver 932 may be coupled to the WLAN baseband processor 930 and an RF antenna 934 may be coupled to the RF transceiver 932. In a particular embodiment, a Bluetooth controller 936 may also be coupled to the DSP 904 and a Bluetooth antenna 938 may be coupled to the controller 936. The general diagram of FIG. 9 also shows that a USB port 940 may also be coupled to the DSP 904. Moreover, a power supply 942 is coupled to the on-chip system 902 and provides power to the various components of the wireless IP telephone 900.

As indicated in the general diagram of FIG. 9, the display 908, the keypad 910, the LED 920, the mono speaker 926, the mono headset 928, the RF antenna 934, the Bluetooth antenna 938, the USB port 940, and the power supply 942 may be external to the on-chip system 902 and coupled to one or more components of the on-chip system 902. In a particular embodiment, the DSP 904 may include one or more multi-mode register files 960 in order to store, e.g., branch prediction information when the register file 960 is not in a first mode (not storing operands for an active thread).

Figure 10:
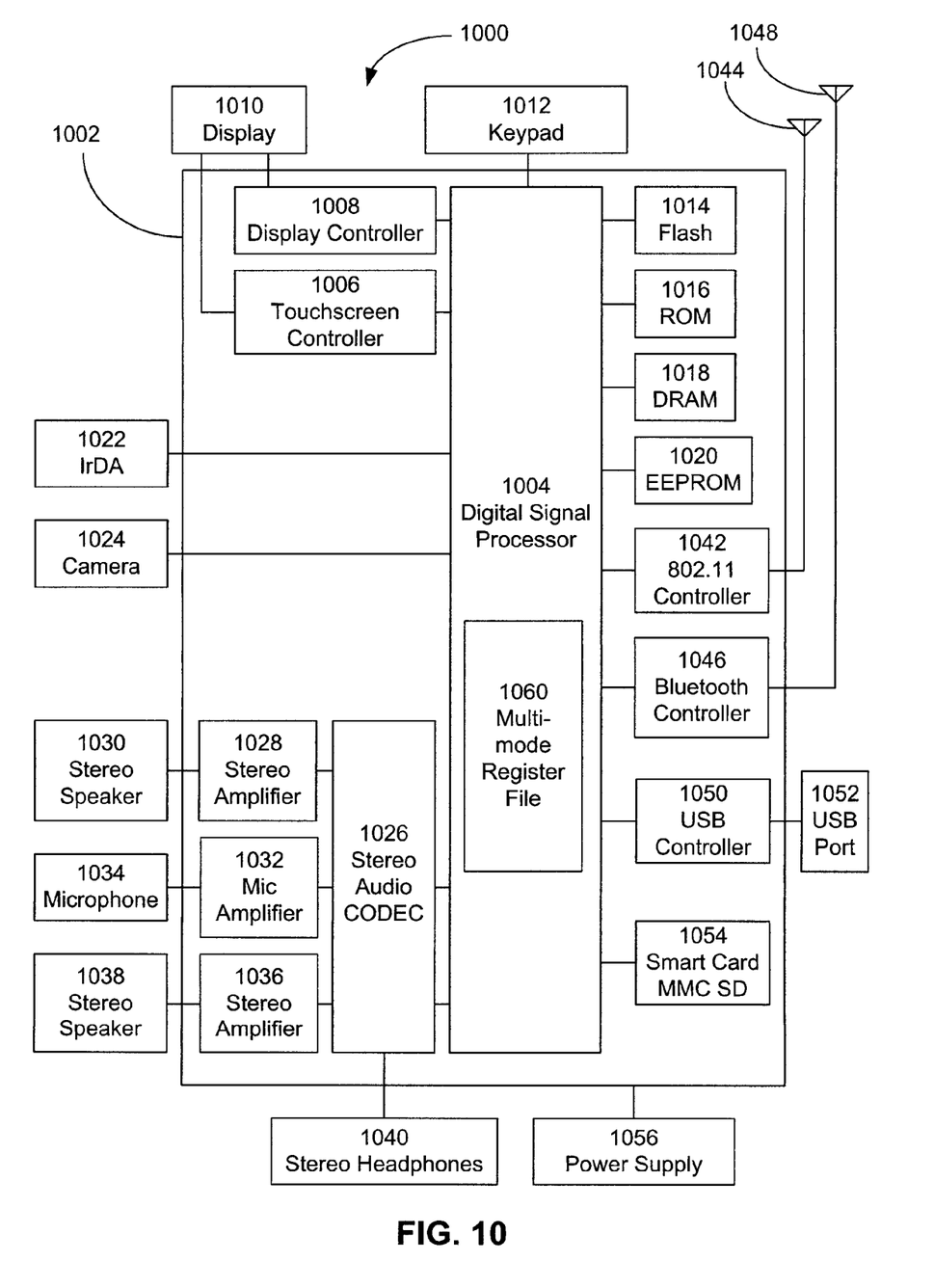
FIG. 10 is a general diagram illustrating an example portable digital assistant incorporating a digital signal processor that may include a multi-mode register file.

FIG. 10 is a diagram illustrating an exemplary embodiment of a portable digital assistant (PDA) 900. As shown, the PDA 1000 includes an on-chip system 1002 that includes a digital signal processor (DSP) 1004. A touchscreen controller 1006 and a display controller 1008 are coupled to the DSP 1004. Further, a touchscreen display 1010 is coupled to the touchscreen controller 1006 and to the display controller 1008. The general diagram of FIG. 10 also indicates that a keypad 1012 may be coupled to the DSP 1004.

In a particular embodiment, a stereo audio CODEC 1026 may be coupled to the DSP 1004. A first stereo amplifier 1028 may be coupled to the stereo audio CODEC 1026 and a first stereo speaker 1030 may be coupled to the first stereo amplifier 1028. Additionally, a microphone amplifier 1032 may be coupled to the stereo audio CODEC 1026 and a microphone 1034 may be coupled to the microphone amplifier 1032. The general diagram of FIG. 10 further shows that a second stereo amplifier 1036 may be coupled to the stereo audio CODEC 1026 and a second stereo speaker 1038 may be coupled to the second stereo amplifier 1036. In a particular embodiment, stereo headphones 1040 may also be coupled to the stereo audio CODEC 1026.

The general diagram of FIG. 10 also illustrates that an 802.11 controller 1042 may be coupled to the DSP 1004 and an 802.11 antenna 1044 may be coupled to the 802.11 controller 1042. Moreover, a Bluetooth controller 1046 may be coupled to the DSP 1004 and a Bluetooth antenna 1048 may be coupled to the Bluetooth controller 1046. A USB controller 1050 may be coupled to the DSP 1004 and a USB port 1052 may be coupled to the USB controller 1050. Additionally, a smart card 1054, e.g., a multimedia card (MMC) or a secure digital card (SD), may be coupled to the DSP 1004. Further, a power supply 1056 may be coupled to the on-chip system 1002 and may provide power to the various components of the PDA 1000.

As indicated in the general diagram of FIG. 10, the display 1010, the keypad 1012, the IrDA port 1022, the digital camera 1024, the first stereo speaker 1030, the microphone 1034, the second stereo speaker 1038, the stereo headphones 1040, the 802.11 antenna 1044, the Bluetooth antenna 1048, the USB port 1052, and the power supply 1050 may be external to the on-chip system 1002 and coupled to one or more components on the on-chip system. In a particular embodiment, the DSP 1004 may include one or more multi-mode register files 1060 in order to store, e.g., branch prediction information when the register file 1060 is not in a first mode (not storing operands for an active thread).

Figure 11:
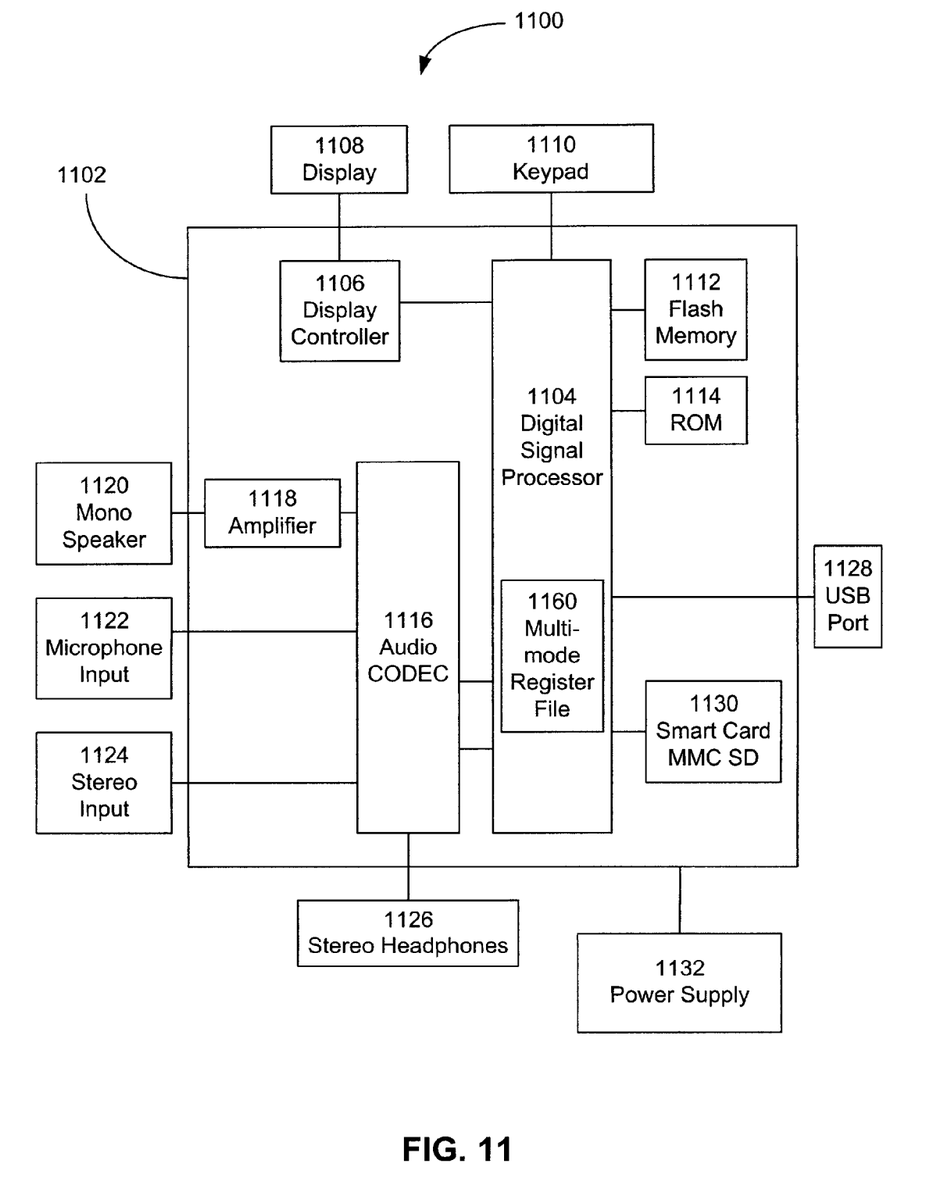
FIG. 11 is a general diagram illustrating an example audio file player incorporating a digital signal processor that may include a multi-mode register file.

FIG. 11 is a diagram illustrating an exemplary embodiment of an audio file player (e.g., MP3 player) 1100. As shown, the audio file player 1100 includes an on-chip system 1102 that includes a digital signal processor (DSP) 1104. A display controller 1106 may be coupled to the DSP 1104 and a display 1108 is coupled to the display controller 1106. In an exemplary embodiment, the display 1108 is a liquid crystal display (LCD). A keypad 1110 may be coupled to the DSP 1104.

As further depicted in the general diagram of FIG. 11, a flash memory 1112 and a read only memory (ROM) 1114 may be coupled to the DSP 1104. Additionally, in a particular embodiment, an audio CODEC 1116 may be coupled to the DSP 1104. An amplifier 1118 may be coupled to the audio CODEC 1116 and a mono speaker 1120 may be coupled to the amplifier 1118. The general diagram of FIG. 11 further indicates that a microphone input 1122 and a stereo input 1124 may also be coupled to the audio CODEC 1116. In a particular embodiment, stereo headphones 1126 may also be coupled to the audio CODEC 1116.

A USB port 1128 and a smart card 1130 may be coupled to the DSP 1104. Additionally, a power supply 1132 may be coupled to the on-chip system 1102 and may provide power to the various components of the audio file player 1100.

As indicated in the general diagram of FIG. 11, the display 1108, the keypad 1110, the mono speaker 1120, the microphone input 1122, the stereo input 1124, the stereo headphones 1126, the USB port 1128, and the power supply 1132 are external to the on-chip system 1102 and coupled to one or more components on the on-chip system 1102. In a particular embodiment, the digital signal processor 1104 may include one or more multi-mode register files 1160 in order to store, e.g., branch prediction information when the register file 1160 is not in a first mode (not storing operands for an active thread).

General

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A register file unit comprising:
   a multi-mode register file,
   the multi-mode register file comprising:
      an register configured to store an operand stored in the multi-mode register file in a first mode and branch prediction information in a second mode, wherein the branch prediction information replaces the operand in the second mode; and
   a register file register corresponding to the multi-mode register file, configured to store information associated with a priority of when switching a mode of the multi-mode register file between the first mode and the second mode is to occur.

2. The register file unit of claim 1, wherein the branch prediction information comprises:
   a branch target cache; and
   a branch history table.

3. The register file unit of claim 1, wherein the multimode register file is one of a plurality of register files in a multi-thread architecture.

4. The register file unit of claim 3, wherein the operand is from an operation of a pipeline of operations to be executed by the multithread architecture.

5. The register file unit of claim 4, wherein the multithread architecture is configured to:
   determine if the multi-mode register file is in the first mode; and
   determine if the multi-mode register file is in the second mode if it is determined that the multi-mode register file is not in the first mode.

6. The register file unit of claim 3, wherein each of the plurality of register files is a multi-mode register file.

7. The register file unit of claim 6, wherein the multithread architecture is configured to determine the priority of the register files to enter the second mode.

8. The register file unit of claim 7, wherein the plurality of register files are configured to split the branch prediction information between a plurality of register files in the second mode.

9. A method, comprising:
   storing an operand by a multi-mode register file in a register during a first mode;
   replacing the operand in the register with branch prediction information by the multi-mode register file in a second mode; and
   associating a register file register with the multi-mode register file to control a priority of when switching a mode of the multi-mode register file between the first mode and the second mode is to occur.

10. The method of claim 9, wherein the branch prediction information comprises:
a branch target cache; and
a branch history table.

11. The method of claim 9, further comprising:
determining if the multi-mode register file is in the first mode; and
determining if the multi-mode register file is in the second mode if it is determined that the multi-mode register file is not in the first mode.

12. The method of claim 9, wherein the multimode register file is one of a plurality of register files in a multithread architecture.

13. The method of claim 12, further comprising:
determining if each of the plurality of register files is in the first mode; and
determining for each of the plurality of register files not in the first mode if each register file is in the second mode.

14. The method of claim 13, further comprising splitting the branch prediction information between a plurality of register files in the second mode.

15. A register file unit, comprising:
a multi-mode register file, the multi-mode register file comprising:
means for storing an operand in a first mode and branch prediction information in a second mode, wherein the branch prediction information replaces the operand in the second mode; and
means for storing priority information associated with the multi-mode register file, such that the means for storing priority information is configured to control switching the multi-mode register file between the first mode and the second mode.

16. The register file unit of claim 15, further comprising:
means for determining if the multi-mode register file is in the first mode; and
means for determining if the multi-mode register file is in the second mode if it is determined that the multi-mode register file is not in the first mode.

17. The register file unit of claim 16, further comprising:
means for determining the priority for each of a plurality of multi-mode register files to enter the second mode, wherein the multi-mode register file is one of the plurality of multi-mode register files.

18. A multi-thread system, comprising:
a multi-mode register file for each thread of the multi-thread system, wherein the multimode register file is configured to store an operand for the thread in a first mode and a branch history table for a different thread in a second mode; and
a multi-mode register file register for each multi-mode register file to determine whether the multi-mode register file is in the first mode or the second mode.

* * * * *